June 7, 1938.  J. D. REIFSNYDER  2,119,720
APPARATUS FOR APPLYING SEALING MATERIAL TO CONTAINERS
Filed Feb. 2, 1935  3 Sheets-Sheet 1
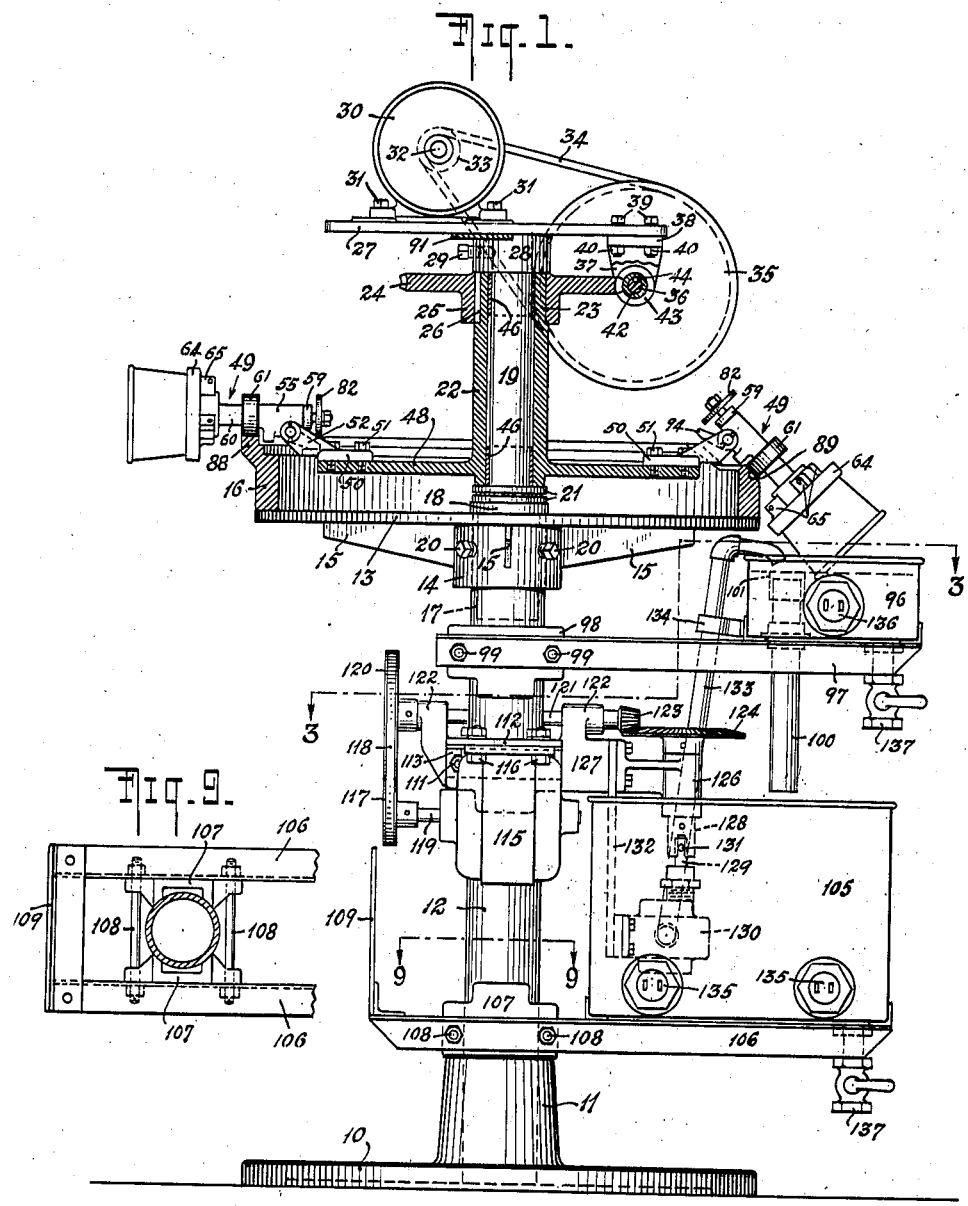
WITNESS
INVENTOR
JAMES D. REIFSNYDER
BY
ATTORNEYS June 7, 1938.  J. D. REIFSNYDER  2,119,720
APPARATUS FOR APPLYING SEALING MATERIAL TO CONTAINERS
Filed Feb. 2, 1935  3 Sheets-Sheet 2
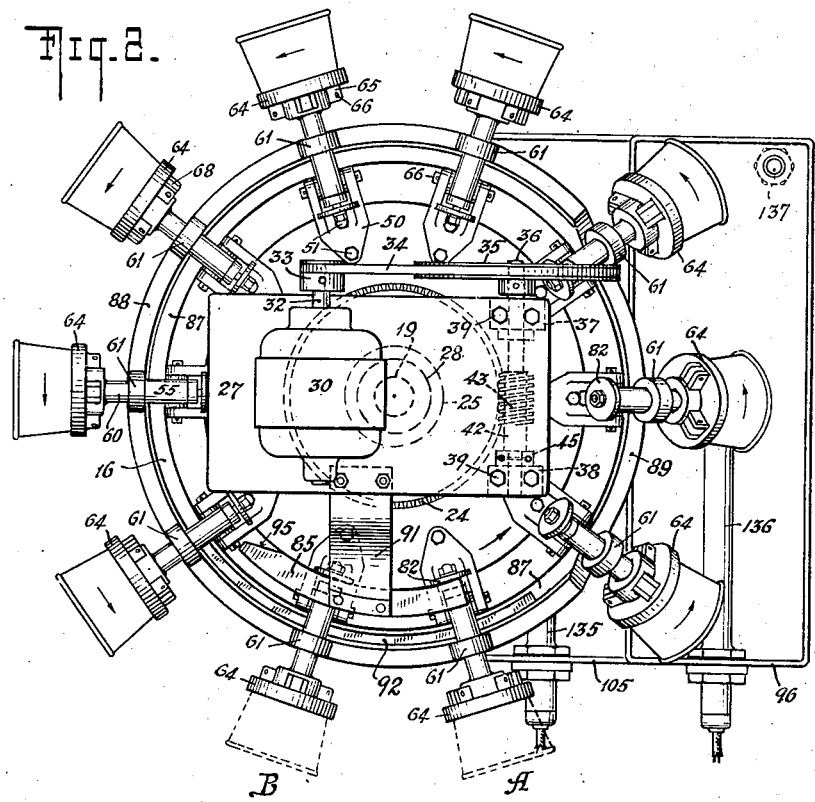
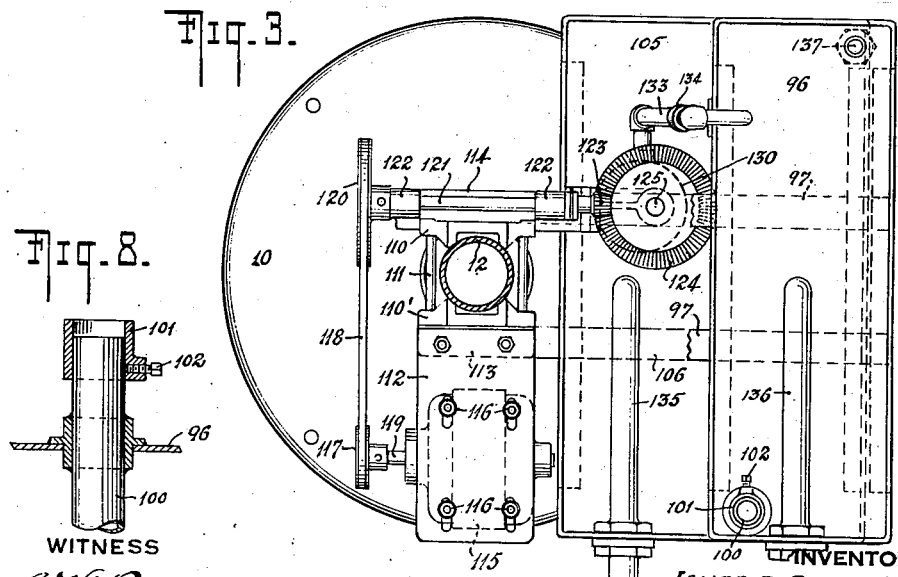
WITNESS
G. V. Rasmussen
INVENTOR
JAMES D. REIFSNYDER
BY
ATTORNEYS June 7, 1938.  J. D. REIFSNYDER  2,119,720
APPARATUS FOR APPLYING SEALING MATERIAL TO CONTAINERS
Filed Feb. 2, 1935   3 Sheets-Sheet 3
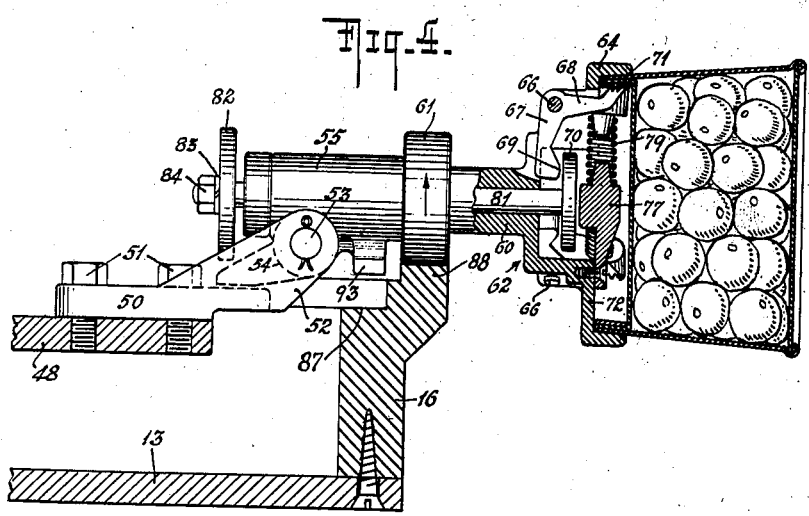
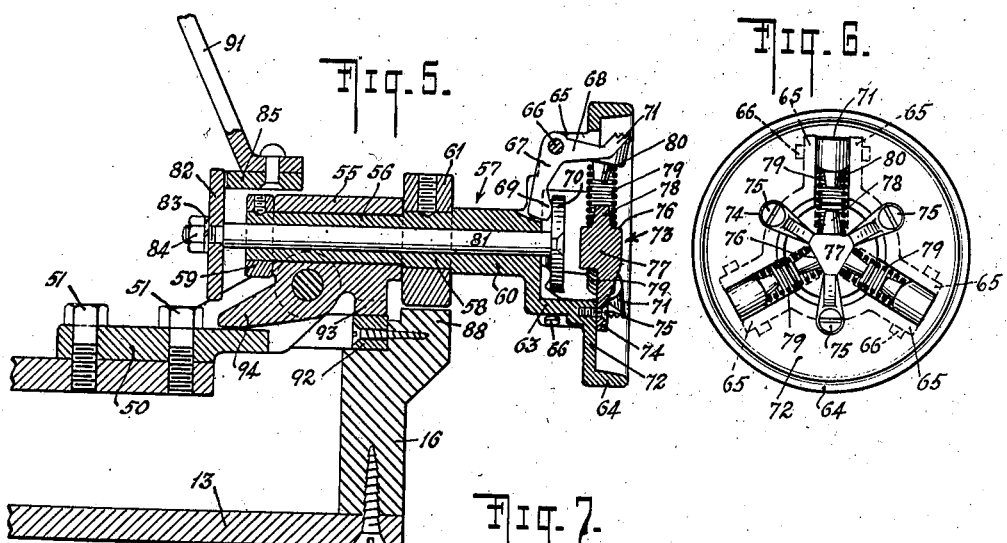
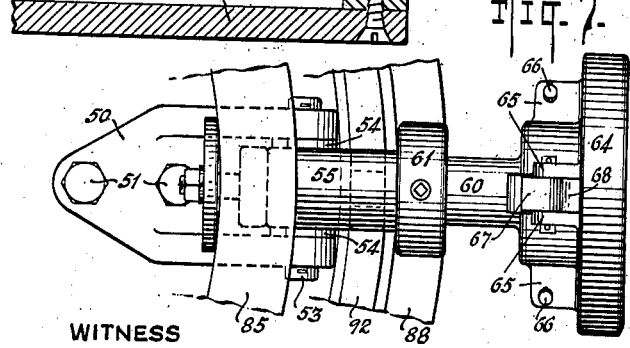
WITNESS
G. V. Rasmussen
INVENTOR
JAMES D. REIFSNYDER
BY
ATTORNEYS Patented June 7, 1938

2,119,720

UNITED STATES PATENT OFFICE 2,119,720

APPARATUS FOR APPLYING SEALING MATERIAL TO CONTAINERS

James D. Reifsnyder, New York, N. Y., assignor to Lily Tulip Cup Corporation, New York, N. Y., a corporation of Delaware Application February 2, 1935, Serial No. 4,640

35 Claims. (Cl. 91—46)

The present invention relates to apparatus for applying a thin coating of sealing material, such as paraffin or the like to containers, particularly containers made of paper or other fibrous material, and has for its principal object to provide an apparatus of the indicated type which will be capable of automatically and quickly applying an even coating of the sealing material to the containers. Other objects of the invention and of details associated therewith will appear from the following specification.

The apparatus was primarily devised and is especially adapted for use in the sealing of containers made of paper or other fibrous material which are intended to be and which shall have been packed with commodities which are to be sold in this form to the consumer. Containers of the indicated type are usually made from a fairly heavy paper stock from which blanks have been cut to form the container bodies. The cut body blanks, after having adhesive material applied thereto, are formed into the proper shape on a forming mandrel, the adhesive material securing the edges of the bodies together. The bottom portions of the containers which may be placed in position after the bodies are formed, or around which the body blanks may be formed, are usually spaced up from the bottom edges of the body portions of such containers so that protection is afforded the bottoms. The bottom edges of the containers are usually reinforced by turning over the bottom edge portions to form double layers of material at this point or by using bottoms having downwardly extending flanges and turning over the bottom edge portions of the bodies to enclose such flanges, in which case a triple layer of material is formed at the bottom edges of the containers. The indicated type of container is usually closed by a disc cover which snugly fits into an internal groove provided adjacent the upper edge of the container. The containers may be treated with paraffin or other suitable material capable of sealing the pores of the paper material of which the containers are constituted and rendering them impervious to fluids. The frusto-conically shaped container having a smaller diameter at the base portion thereof than at the mouth or top portion and adapted to contain approximately one pound of food material represents the typical shape and size of the containers. The filling the containers is usually done in a filling apparatus which discharges in to the containers the proper amount of the commodity to be contained therein. When the containers are filled, the disc covers are then forced into place in the mouth or open portions thereof so that the edges of the disc covers seat in the internal grooves provided adjacent the open ends of the containers. The upper end portion of the containers may then be rolled in any suitable manner so as to form a bead on the upper edges thereof which renders that portion of the containers sufficiently rigid to withstand the strains or pressures to which they will be ordinarily subjected during the shipment of the containers. In accordance with the present invention, the thus filled containers are then fed into the apparatus where sealing material such as paraffin will be applied to the upper edge portions of the containers and to the outer edges of the covers thereof so that any space therebetween will be sealed, thereby hermetically sealing the contents of the containers. When the containers have been coated on their interior surfaces with a sealing material such as paraffin before being packed, I have found that by proper control of the temperature of the paraffin which is applied by the apparatus for sealing purposes, the outer edges of the covers may be embedded in a homogeneous mass of paraffin, formed from the paraffin which had formerly been placed on the surface of the containers and the paraffin applied by the apparatus, which when hard in effect solidifies the covers with the containers and provides a seal of unusual strength which will stand up under rough usage and which will enable the containers to hold air pressure or vacuum over an extended period without leakage. The nature and utility of the invention will be sufficiently understood from the following description of the apparatus as designed and used for the just stated purpose, although evidently it may be used in the sealing of other types of containers or where a coating of paraffin or other material is to be applied to the containers for purposes other than sealing the covers to the containers.

The accompanying drawings illustrate by way of example a representative embodiment of the invention. In such drawings, Fig. 1 is a side elevation, partly in section, of the entire apparatus; Fig. 2 is a top view of the apparatus showing the arrangement of the container holders; Fig. 3 is a section taken along the line 3—3 of Fig. 1; Fig. 4 is a detailed side view, partly in section, of a container holder with a container mounted therein; Fig. 5 is a detailed side view, in section, of a container holder showing the position of the parts when a filled container is being inserted in position therein or being removed therefrom; Fig. 6 is a detailed front view of the gripping mechanism in the container holder; Fig. 7 is a top view of the parts shown in Fig. 5; Fig. 8 is a side elevation, partly in section, of the level control for the wax bath and Fig. 9 is a detailed section taken along 9—9 of Fig. 1 showing the arrangement of the lower supporting arms on the standard.

Referring more particularly to Fig. 1 of the drawings, the apparatus illustrated comprises a base or pedestal 10 having a raised hub section 11 which supports a hollow standard 12 in vertical or upright position. Arranged adjacently to the upper end of the standard 12 is a circularly shaped table 13 provided with a centrally disposed hub section 14 through which the upper end portion of the standard extends. Integrally formed with the table 13 and the hub section 14 are radially extending arms or reinforcing braces 15 which render the construction of the table relatively strong and rigid. An upwardly extending annular flange or rim 16, preferably made of wood, is provided on the outer edge portion of the table 13, the upper portion of such flange serving as a track on which the holders for the filled containers ride and being formed to enable the holders to dip the containers into a sealing bath as will be hereinafter more fully explained. The upper end of the standard 12 is provided with an internal sleeve 17 whose outer surface snugly engages with the inner surface of the upper end portion of the standard, the sleeve being positioned within the standard by an outwardly extending flange 18 which is formed integrally with the upper end thereof and rests upon the upper end of the hollow standard 12. The interior surface of the sleeve 17 is in snug engagement with the outer surface of the lower end portion of a vertically disposed shaft or stem 19 so that the sleeve functions to securely support said shaft vertically in the upper end of the standard 12. The table 13, the sleeve 17 and the shaft 19 are fixedly secured in position on the upper end of the standard 12 by means of the set screws or bolts 20 which are in threaded engagement with the hub section 14 of the table 13 and extend through said section and through openings in the annular walls of the standard 12 and the sleeve 17 and engage with the outer surface of the shaft 19.

Seated on the flange 18 of the sleeve 17 and encircling the shaft 19 is a thrust bearing 21 which supports on its upper race a vertically disposed sleeve 22 which is mounted for rotative movement on the shaft 19 intermediate of the latter's length. The upper end portion 23 of the sleeve 22 which is of smaller diameter than the remainder of the sleeve, is adapted to receive a worm gear 24 having a centrally positioned hub section 25 through which the reduced portion 23 of the sleeve and the upper end portion of the shaft 19 extend. The worm gear 24 is arranged for rotation with the sleeve 22 by a key 26 which is received in a key way formed by slots provided in the hub 25 of the worm gear and the reduced portion 23 of the sleeve. Supported on the top end of the shaft 19 is a platform 27 which has integrally associated with the under side thereof a hub or collar 28 adapted to receive the top end portion of the shaft 19. A set screw or bolt 29 which is in threaded engagement with the hub 28 extends through such hub and engages with the outer surface of the shaft 19 to fix the platform in non-rotatable relation with respect to said shaft. An electric motor 30 is mounted on the platform 27 and is securely affixed to the latter by means of the bolts 31 which pass through suitable openings in the base of the motor and threadedly engage with the platform 27. The motor is suitably connected to a source of current (not shown). Fixedly secured to the drive shaft 32 of the motor is a pulley wheel 33 which engages with one end of a belt or drive 34, the other end of such belt passing around a pulley wheel 35 fixedly secured to one end of a shaft 36. As shown more clearly in Fig. 2, the shaft 36 is mounted for rotative movement in the bearing brackets 37 and 38 which depend from the under side of the platform 27 and are affixed thereto by the bolts 39 and nuts 40. Mounted on the shaft 36, intermediate the bearings 37 and 38 is a sleeve 42 having its outer surface formed to provide a spiral gear or worm 43. The sleeve 42 is arranged for rotation with the shaft 36 by a key 44 which is received in a key way formed by slots provided in the inner surface of the sleeve 42 and the outer surface of the shaft 36 and placed in alignment. The worm 43 engages with the teeth of the worm gear 24 to drive the latter in a counter-clockwise direction, as viewed in Fig. 2. A thrust bearing 45 is provided on the shaft 36 intermediate the sleeve 42 and the bearing 38 to take care of the thrust in the direction of the bearing 38 when the parts are in operation.

It will be clear that the parts thus far described are so assembled that when the motor 30 is operating, it will cause the rotation of the sleeve 22 about the shaft 19 in a counter-clock direction, as viewed from the top of the machine, through the medium of the pulley 33, belt 34, pulley 35, shaft 36, worm 43 and the worm gear 24. As is more clearly shown in Fig. 1 of the drawings, the sleeve 22 preferably has an internal diameter slightly greater than the diameter of the shaft 19 and is provided with brass bushings 46 which are fixed to the inner surface of the end portions of the sleeve in order to reduce the friction between the sleeve and the shaft 19 to a minimum. As before described, the shaft 19 is fixedly mounted within the sleeve 17 on the upper end of the standard 12 by means of the set screws or bolts 20, and the platform 27 is fixedly supported upon the top portion of the stationary shaft 19 by means of the set screw 29. The motor 30 is preferably so positioned on the platform 27 with respect to the parts driving the sleeve 22 that the strains produced in the platform 27 during the operation of the machine will be substantially equalized.

As is clearly shown in Fig. 1 of the drawings, an outwardly extending flange or turntable 48 is integrally formed with the lower end portion of the rotatable sleeve 22 and rotates about the shaft 19 with said sleeve when the motor is operating. The turntable 48 is of such diameter and is so positioned with relation to the upstanding flange or circular rim 16 on the stationary table 13 that the holders 49 for the containers which are pivotally mounted at their inner ends on supporting brackets positioned around the circumferential edge portion of the turntable, are enabled to be rotatably supported on the rim 16 intermediate of their front and rear ends, as shown in Fig. 2.

The container holders 49, of which there are ten in the apparatus illustrated, each have their individual supporting brackets consisting of a base portion 50 which is securely fastened to the edge portion of the table 48 by the threaded bolts 51 and two substantially parallel arms 52 which are integral with the base portion at their lower ends and extend obliquely outward from the edge of the table 48, as shown in Fig. 4, the upper ends of said arms being provided with aligned openings which are adapted to receive the ends of a rotatable shaft 53. The shaft 53 extends through a substantially cylindrically shaped portion 54 integral with the underside of a substantially cylindrically shaped section 55 of the holder 49 and positioned transversely thereof adjacent its rear end. The section 55 is in the nature of a hollow bearing and rotatably supports the reduced end portion 56 of a hollow shaft or stem, generally designated as 57, which extends therethrough. The section or bearing 55 is positioned between a portion 58 of the shaft 57 which has a slightly greater diameter than the portion 56 and a collar 59 securely fastened to the outer end of the portion 56 of the shaft so that longitudinal movement of the shaft 57 is prevented. Fixedly attached by means of a set screw to the portion 58 of the shaft 57, intermediate the bearing 55, and a portion 60 of the shaft 57 which has a slightly greater diameter than the portion 58 thereof, is a roller 61 adapted to ride on the upper edge of the flange or rim 16, as shown in Fig. 4, as the turntable 48 is rotated thereby causing rotation of the shaft 57.

Integrally associated with the outer end of the shaft or stem 57 is an enlarged head, generally designated as 62, which comprises a hollow hub-like portion 63 immediately associated with the shaft 57 and an outer annularly shaped hollow portion 64 of larger diameter than the hub-like portion 63. Integral with the outer surfaces of the portions 63 and 64 of the head 62, are three sets of bearing supports 65 each of which rotatably supports a shaft 66 having mounted thereon an angular lever comprising arms 67 and 68. The arms 67, 68 of each angular lever extend through slots provided in the portions 63 and 64 of the head 62 intermediate the bearing supports 65. The outer free end of each of the arms 67 of the angular levers is provided with an off-set portion 69 which is adapted to bear against the inner face of a plunger head 70 positioned within the hub-like portion 63 of the enlarged head 62. The arm 68 of each of the angular levers extends into the recess provided in the portion 64 of the head 62 and is provided at its outer end with an outwardly extending off-set portion 71 which is adapted to bear against the inner annular side of the portion 64 of the holder. Seated on the shoulder 72 formed by the head portion 64 is a spider generally designated as 73, the outwardly extending arms 74 of which are secured at their outer end portions to the shoulder 72 by means of the screws 75. The side faces 76 of the substantially triangularly shaped central portion 77 of the spider have integrally associated therewith frusto-conically shaped projections 78 which serve as supports for one end of the springs 79, the other ends of such springs being supported on similarly shaped projections 80 formed on the outer end portions of the lever arms 68 and disposed oppositely of the off-set portions 71 thereof. Thus, by reason of this arrangement, the off-set portions 71 of the lever arms 68 are positively urged by the tension of the springs 79 toward the inner annular side of the head portion 64. The head portion 64 is adapted to receive the bottom end portion of a filled container, as more clearly shown in Fig. 4, the interior diameter of the annular side of said head portion being approximately the same as the exterior diameter of the bottom end portion of the container so that the latter snugly fits in such head portion. When a container is thus seated in the head portion 64, the off-set portions 71 of the lever arms 68 engage with the interior side surface of the bottom edge portion of the container below the bottom thereof. The springs 79 are sufficiently strong to cause the off-set portions 71 to tightly bear against the interior bottom portion of the container so that the container will not become loosened while passing through the machine. The ends of the off-set portions which contact with the interior surface of the container are preferably provided with teeth in order that any tendency of the container to slip out of the holder in its passage through the machine is prevented. The central portion 77 of the spider 73 is preferably formed so as to limit the forward movement of the plunger 70 and operates as a stop to prevent the teeth on the off-set portions 71 from engaging with the annular side wall of the head portion 64 when the holder is not supporting a container, through the medium of plunger head 70, projection 69 on the lever arm 67 and the lever arms 67 and 68.

In order that a container may be inserted in or removed from the holder 49, means are provided to rotate the arms 68 of the angular levers about their shafts 66 toward the axial center of the head portion 64 against the tension of the springs 79. The means for accomplishing this comprise the plunger head 70, a plunger shaft 81 which is fixedly attached to the plunger head 70 and extends axially through the shaft 57 and a disc shaped member 82 fixedly secured on the reduced end portion 83 of the shaft 81 by means of a nut 84 which is in threaded engagement therewith. A cam 85 bears against the inner face of the disc member 82 when the holder 49 has moved to a predetermined position with respect to the rim 16, as will be hereinafter more fully explained, and forces said member away from the rear end of the holder, as shown in Fig. 5. As the disc member 82 is moved away from the holder 49, the shaft 81 and plunger head 70 are caused to move in a rearward direction with the disc member, the plunger head 70 in its rearward movement causing each of the arms 67 of the angular levers to rotate about its shaft 66, in a clockwise direction as viewed in Fig. 5, thereby causing the arms 68 of the angular levers to rotate toward the axial center of the head portion 64 and enabling a container to be either inserted in or removed from the holder 49.

The annularly shaped flange or rim 16 of the stationary table 13 is provided adjacent its upper edge 87 with an upstanding off-set portion 88 which is formed integral with the outer edge portion of the rim 16 and extends around the upper edge of the rim for substantially three-fourths of its circumference. The upper edge of the off-set portion 88 is so positioned with respect to the roller 61 on the holder 49 that said roller is enabled to ride thereon during the rotational movement of the table 48 and is of such height that when the roller is riding on its upper edge, the holder 49 is supported in a substantially horizontal position. That portion of the annular flange 16 which is not provided with the off-set portion 88, is beveled along its upper outer edge, as shown in Figs. 1 and 2 to form the inclined edge 89. The ends of the off-set portion 88 are sloped in such manner that the roller 61 on the holder 49 may readily ride onto and off the inclined edge 89 from and onto, respectively, the upper edge of the off-set portion. When the roller 61 of holder 49 is riding on the beveled edge portion 89, the holder is no longer held in horizontal position but is tilted downwardly a sufficient amount so that the upper edge portion of the container is dipped in a bath of wax or other suitable sealing material, as shown in Fig. 1.

The cam 85 for withdrawing the disc member 82 on the holder 49 to enable a container to be removed from or inserted into the holder is mounted on the lower end of a support or depending arm 91 which is securely attached at its upper end to the underside of the platform 27 by screws or other suitable means. As shown in Fig. 2, the arm 91 depends outwardly in an oblique direction from the platform 27 to hold the inner edge of the cam 85 which is arcuately shaped, substantially directly above the circular edge of the turntable 48 on which the holders 49 are mounted, such arm 91 being positioned on the platform 27 so that the cam 85 is adapted to be in engagement with the disc member 82 of the holder just before the holder 49 rides down on the inclined edge 89 of the circular flange 16. The inner edge of the cam 85 is cam faced at 95 to enable the disc members to readily ride upon the inner edge thereof. The cam 85 is preferably of such length that two adjacently positioned holders are always in engagement therewith.

As shown in Figs. 2 and 5, an arcuately shaped rail 92 is provided on the upper edge 87 of the circular flange 16. A depending projection or heel 93 formed integrally with the under side of the bearing section 55 of the holder 49 is adapted to ride on such rail and lift the roller 61 from contact with the upper edge of the off-set portion 88 of the circular flange 16 whereby the holder 49 may be moved about the sleeve 22 without rotational movement of the shaft 57 and the enlarged head 62 about their own axes. The rail 92 is positioned on the upper edge 87 of the flange 16 so that such non-rotation of the shaft 57 and the enlarged head 62 about their own axes occurs during the period that the cam 85 is in engagement with the disc member 82 to hold the off-set portions 71 on the outer end portions of the lever arms 68 in releasing position. The rail 92 is preferably sloped at each end to enable the projection 93 to ride on and off the rail without any abrupt jerky motions. Integrally associated with the cylindrical portion 54 of the bearing section 55 of the holder is an inwardly extending portion or toe 94 which is adapted to operate as a stop to limit the upward movement of the holder 49 thereby preventing any jumping of the holder as the projection 93 rides on or off the rail 92, when the cam 85 engages with the disc member 82 or when the holder rides on or off the inclined edge 89 of the annular section 16.

It will be clear from the above that the containers which have been packed with the desired commodity and covered, are inserted in the holders 49 at the position designated A in Fig. 2 of the drawings and are removed from the containers at the position designated B in said Fig. 2 after having traveled almost completely around the track formed by the upper edge of the off-set portion 88 and the inclined edge 89. The rotational movement of the turntable 48 is continuous in the apparatus illustrated so that while the apparatus is operating, the holders 49 are continually traveling around the track in a counter-clockwise direction as viewed in Fig. 2, but it is within the contemplation of the invention to move the various parts intermittently. In both the positions designated A and B, the depending projections 93 of the two holders 49 which are in engagement therewith are resting on the track 92 so that the rollers or wheels 61 of the holders are out of contact with the upper edge of the off-set portion 88 of the rim 16 thereby preventing any rotational movement of the shafts 57 and enlarged head portions 62 of these holders about their own axes. In either of the positions A or B, the rear edge of the cam 85 is bearing against the side face of the disc member 82 of a holder thereby holding the shaft 81 and plunger head 70 of the holder in retracted position. As shown in Fig. 5, the retracted plunger head 70 bears against the projection 69 on the end of the arm 67 of the angular or bell crank lever to hold the latter in its rearward position, thereby holding the arm 68 of the angular lever and the off-set portion 71 on the outer end thereof disposed toward the axial center of the head portion 64 against the tension of the springs 79. It will thus be clear that a container may readily be inserted into the end of or removed from the holders when the latter are in the positions designated A and B. When the operator inserts the bottom end of a container in the end of a holder at the position designated A, he holds it in position until the holder has been moved by the table 48 past the end of the cam 85. The release of the disc member 82 by the cam 85 releases the shaft 81 and the plunger head 70 and enables the springs 79 in the head portion 62 to rotate the lever arms 68 about their pivots 66 and to force the toothed edge portions 71 against the interior surface of the bottom edge of the container, thereby tightly clamping the bottom edge of the container against the annular wall of the head portion 64. The rotative movement of the arms 68 of the angular levers under the influence of the springs 79 simultaneously causes the arms 67 thereof to rotate forwardly and force the projections 69 on the arms 67 against the inner face of the plunger 70 thereby moving the plunger head 70, the shaft 81 and the disc 82 forwardly. Upon continued movement of the holder about the sleeve 22 the projection 93 on the holder 49 rides off the arcuately shaped track 92 and enables the roller 61 to contact with the upper edge of the off-set portion 88 whereupon rotational movement is imparted to the shaft 57, the head 62 and the packed container about their central axes. Further movement of the table 48 brings the holder to the end of the off-set portion 88 and the roller 61 rides down the incline which connects the upper edge of the off-set portion with the inclined edge 89 on the annular rim 16. During the period that the holder is riding on the inclined edge 89 it is tilted downwardly to enable the upper edge portion of the container to dip in the sealing material contained in the tank 96 to a sufficient depth so that upon continued rotation of the container about its axis as the holder moves along the inclined edge 89 a thin even coating of sealing material is applied to the upper edge portion of the container and the outer edge portion of the cover on such container thereby hermetically sealing the contents of the container. Further rotation of the table 48 causes the holder 49 to ride up the inclined surface at the other end on the inclined edge 89 and onto the upper edge of the off-set portion 88. The table 48 continues the movement of the holders in a counter-clockwise direction and during such movement the containers are being continually rotated about their own axes, such movement causing the sealing material to set evenly around the outer edge of the cover on the container and aids in the drying of the sealing material. Just prior to reaching the position designated B, the projection 93 on the holder engages with the track 92 thereby lifting the roller clear of its track so that the shaft 57 and the enlarged head 62 of the holder cease to rotate about their own axes thereby stopping the rotational movement of the container held in such enlarged head about its own axis. The point at which the track 92 will be engaged by the projections 93 of the holder is of course dependent upon the type of sealing material and the thickness of the applied coating and the track 92 is so constructed and arranged with respect to the several cooperating parts that under the conditions which the apparatus is working, the rotation of the holder is continued for a predetermined time after the passage of the container through the sealing material until the applied coating on the container has reached a condition such as to permit removal from the holder. The cam faced end portion 95 of the cam 85 then engages with the disc member 82 on the holder and retracts the disc member 82, shaft 81 and plunger head 70 against the tension of the springs 79, these parts being withdrawn to fully retracted position when the disc member 82 is engaged with the rear edge of the cam 85 so that the off-set portion 71 on the lever arm 68 in the head portion 62 of the holder is withdrawn from the inner side of the bottom edge portion of the container as hereinabove explained, thereby enabling the operator to remove the sealed container.

The material for sealing the covers on the containers is contained in a tank 96 which is supported on the outer end portions of two substantially parallel angle iron arms 97. The inner end portions of the angle iron arms 97 are secured to the outer side surfaces of two oppositely disposed clamping jaws 98 by means of the two bolts 99, each of which extends through openings provided in the two angle iron arms and the two clamping jaws and fixedly secure the angle iron arms and clamping jaws in position on the standard 12. The arrangement of the angle iron arms 97, clamping jaws 98 and bolts 99 with respect to the standard 12 is similar to the arrangement of the angle iron arms 106, clamping jaws 107 and bolts 108 respectively which is shown in Fig. 9 of the drawings. The tank 96 is provided with an overflow outlet whereby the level of the sealing material in the tank may be maintained at a predetermined level. As shown more particularly in Fig. 8 of the drawings, the overflow outlet comprises a pipe 100 which extends through an opening in the bottom of the tank and is supported in any suitable manner by such bottom. The portion of the pipe 100 within the tank 96 rises vertically to a height which has been selected as the lowest level at which the sealing material will be maintained in the tank for this particular operation. A collar or sleeve 101 is secured to the upper end portion of the pipe 100 by means of a set screw 102. The position of the sleeve 101 may be vertically adjusted to vary the level of the sealing material in the tank. It will thus be clear from the description hereinabove set forth, that the degree to which the container is dipped in the wax or paraffin can be controlled by varying either the angle at which the edge 89 on the cylindrical track 16 is inclined, the position of the clamping jaws and angle iron arms supports 97 on the standard 12 thereby varying the position of the tank 96 with respect to the container holders 49, the position of the collar or sleeve 101 on the upper end portion of the overflow pipe 100 or by varying any two or three of the above mentioned parts. This adjustability of the various parts renders the apparatus not only capable of use for sealing containers of different sizes but also makes it adaptable for use in coating the inner and outer surfaces of empty containers with paraffin or other material to render such containers liquid proof. When the apparatus is to be used for the latter purpose, the arms 68 of the angular levers in the enlarged heads 62 of the holders are preferably made of such length that they extend an appreciable distance beyond the annular walls of the head portions 64 so that the containers which will be thus supported solely by the outer ends of the lever arms 68 may be suitably dipped in the sealing material to accomplish this purpose without having the sealing material come into contact with the operating parts of the holder.

The sealing material is fed to the dipping tank 96 from a supply tank 105 which is supported on a pair of angle iron arms 106 which are positioned substantially parallel to each other and are secured intermediate their ends to the outer side surfaces of two clamping jaws 107 by means of two bolts 108, each of which extends through openings provided in the two angle iron arms and the two clamping jaws and fixedly secure the angle iron arms and clamping jaws to the standard 12, as shown more clearly in Fig. 9. A guard 109 is mounted on the angle irons 106 as shown in Figs. 1 and 9.

A pair of clamping jaws 110 and 110' are fixedly secured to the standard 12 intermediate the clamping jaws 98 and the clamping jaws 107 and adjacently to the former by means of the bolts 111, as shown in Fig. 3. The clamping jaw 110 is integrally formed with a bearing bracket support 114 provided with spaced bearing brackets 122. The clamping jaw 110' has secured to its outer side surface by means of the bolts 111 a short angle iron support 113 to which a motor platform 112 is fastened by means of bolts.

Supported on the underside of the platform 112 by means of the bolts 116 is a motor 115 which is suitably connected to a source of current (not shown). A pulley wheel 117 having a recessed rim adapted to receive a belt or drive 118 is affixed to the outer end of the motor shaft 119. The other end of the belt 118 passes around the outer edge of a pulley wheel 120 affixed to one end of a shaft 121 which is rotatably supported in the spaced bearings 122 which are integral with the bearing support 114. The opposite end of the shaft 121 is provided with a bevel gear 123 which engages with a horizontally disposed bevel gear 124 mounted on the upper end of a vertically positioned shaft 125. The shaft 125 is mounted on a bearing bracket 126 which is mounted on an extended portion 127 of the bearing support 114. Securely fastened to the lower end of the shaft 125 by means of a set screw is a sleeve 128 whose lower end portion extends below the end of the shaft 125 and which is provided at said lower end portion with two vertically disposed keyway slots positioned in alignment. The sleeve 128 and the hub of the bevel gear 124 prevent vertical movement of the shaft 125 in the bearing bracket 126 during rotation of said shaft. The upper end portion of the shaft 129 of the pump 130 which is positioned within the supply tank 105, extends into the sleeve 128 and is coupled thereto by means of the pin 131 on said shaft which engages with the keyway slots. A depending plate 132 which is mounted at its upper end between the bearing bracket 126 and the extended portion 127 of the bearing support 114, extends down into the supply tank 105 and supports at its lower end the pump 130 which is suitably connected thereto by means of bolts. A vertically disposed pipe 133 is suitably coupled at its lower end to the pump 130, the upper end of said pipe being provided with an outlet and positioned so that said outlet will discharge into the dipping tank 96 any sealing material pumped up through the pipe. It will be obvious from the above that the motor 115 drives the pump 130 through the pulley 117 mounted on the motor shaft 119, belt 118, pulley 120, shaft 121, bevel gear 123, bevel gear 124, shaft 125, the coupling members 128, 131, and the pump shaft 129 to pump the sealing material in the supply tank 105 up through the pipe 133 into the dipping tank 96. A bracket 134 supports the upper end of the pipe 133 in proper position with respect to the tank 96.

Two heating elements 135 are provided in the supply tank 105 to maintain the sealing material at a predetermined temperature. A heating element 136 is also positioned longitudinally of the dipping tank 96 to maintain the sealing material in this tank at a desired temperature. The heating elements 135 and 136 are suitably connected to a source of current (not shown). Outlets or drains 137 are provided in the bottoms of the tanks 96 and 105 for draining out the sealing material when the apparatus is not in use.

It will be obvious to those skilled in the art that the invention is capable of a wide variety of modification and adaptation and that the present disclosure is intended merely to illustrate its nature without limiting its scope which is set forth in the appended claims.

I claim:

1. In an apparatus for applying sealing material to containers, the combination of a movable support, a plurality of container holders pivotally mounted on said support, and adapted to carry containers so that the central axes thereof project outwardly from the support, each of said holders comprising means adapted to engage one end of a container and to support the container with its other end projecting freely beyond said holder during the travel of said movable support, means for revolving the holders so that the containers carried thereby are rotated about their central axes, a tank containing sealing material positioned close below the path of the containers on said holders, and means for pivoting the container holders about their supports when the containers carried thereby are positioned above said tank of sealing material so that the free ends of the rotating containers are dipped into the sealing material, said revolving means being adapted to rotate said holders and containers continuously during the passage of the containers through the sealing material and for a predetermined time thereafter.

2. In an apparatus for applying sealing material to containers, the combination of a movable support, a plurality of container holders pivotally mounted on said support, and adapted to carry containers so that the central axes thereof project outwardly from the support, each of said holders comprising means adapted to engage one end of a container and to support the container with its other end projecting freely beyond said holder during the travel of said movable support, means for revolving the holders so that the containers carried thereby are rotated about their central axes, a tank containing sealing material positioned close below the path of the containers on said holders, and means for pivoting the container holders about their supports to dip the free ends of the rotating containers carried thereby into said tank, said means being adapted to maintain the container holders tilted at a predetermined angle from the horizontal during the major portion of the travel of the containers across the tank, said revolving means being adapted to rotate said holders and containers continuously during the passage of the containers through the sealing material and for a predetermined time thereafter.

3. In an apparatus for applying sealing material to containers, the combination of a movable support, a plurality of container holders pivotally mounted on said support, each of said holders being adapted to engage the bottom end of a container and hold the container so that the central axis thereof projects outwardly from the support, means for revolving the holders so that the containers carried thereby are rotated about their central axes, means for rendering said holder revolving means inoperative during the delivery of a container to a holder, a tank containing sealing material positioned close below the path through which the containers are moved by the movable support, and means for pivoting the container holders to dip the rotating containers into and remove them from said tank as the containers are carried along by said movable support, said revolving means being adapted to rotate said holders and containers continuously during the passage of the containers through the sealing material and for a predetermined time thereafter.

4. In an apparatus for applying sealing material to containers, the combination of a movable support, a plurality of container holders mounted on said support for pivotal and rotational movement, each of said holders being adapted to engage the bottom end of a container and hold the container so that the central axis thereof projects outwardly from the support, stationary means engaging with said holders intermediate their ends for supporting the same in substantially horizontal position and for revolving said holders as they are carried along by said movable support so that the containers on said holders are rotated about their central axes, a tank containing sealing material positioned close below the path of the containers on said holders, and means for pivoting the container holders to dip the rotating containers into and remove them from said tank as the containers are carried along by said movable support, said revolving means being adapted to rotate said holders and containers continuously during the passage of the containers through the sealing material and for a predetermined time thereafter.

5. In an apparatus for applying sealing material to containers, the combination of a movable support, a plurality of container holders mounted on said support for pivotal and rotational movement, each of said holders being adapted to engage the bottom end of a container and hold the container so that the central axis thereof projects outwardly from the support, a track positioned adjacent to said movable support and extending along the path of said holders, means on said holders intermediate the ends thereof adapted to ride on said track and thereby cause rotation of said holders and the containers about their own axes, said track comprising a level portion for supporting the holders in substantially horizontal position and a depressed inclined portion for supporting the holders in tilted position and a tank containing sealing material positioned close below the depressed inclined portion of the track so that the containers on said holders will be dipped into the sealing material as the holders ride on said inclined portion of the track, said inclined portion and said level portion of the track coacting with the riding means on said holders to rotate the containers continuously during their passage through the sealing material and for a predetermined time thereafter.

6. In an apparatus for applying sealing material to containers, the combination of a movable support, a holder provided with a recessed outer end for receiving the bottom end portion of a container having its bottom spaced upwardly from the bottom edge thereof, means within said recess adapted to engage with the inner surface of the bottom end portion of the container and to support the container securely on the holder, means for supporting the inner end of said holder on said movable support, means for revolving the holder so that the container carried thereby is rotated about its central axis, a tank containing sealing material positioned close below the path of the container on said holder, and means for lowering the outer end of said holder so that the rotating container carried thereby is dipped into the sealing material in said tank, said revolving means being adapted to rotate said holders and containers continuously during the passage of the containers through the sealing material and for a predetermined time thereafter.

7. In an apparatus for applying sealing material to containers, the combination of a movable support, a holder provided with a recessed outer end for receiving the bottom end portion of a container having its bottom spaced upwardly from the bottom edge thereof, spring tensioned means within said recess adapted to engage with the inner surface of the bottom end portion of the container and to support the container securely on the holder, means for pivotally and rotatably supporting the inner end of said holder on said movable support, means for revolving the holder so that the container carried thereby is rotated about its central axis, a tank positioned close below the path of the container on said holder, and means for pivoting said holder about its support so that the rotating container carried thereby is dipped into the sealing material in the tank, said revolving means being adapted to rotate said holders and containers continuously during the passage of the containers through the sealing material and for a predetermined time thereafter.

8. In an apparatus for applying sealing material to containers, the combination of a movable support, a holder provided at its outer end with a plurality of holding members adapted to engage with the inner surface of the bottom end portion of a container having its bottom spaced upwardly from the bottom edge thereof, means for causing said holding members to bear against said inner surface of the container with sufficient pressure to support the container, means for pivotally and rotatably supporting the inner ends of said holder on said movable support, means for revolving the holder so that the container carried thereby is rotated about its central axis, a tank positioned close below the path of the container on said holder, and means for pivoting said holder about its support so that the rotating container carried thereby is dipped into the sealing material in the tank, said revolving means being adapted to rotate said holders and containers continuously during the passage of the containers through the sealing material and for a predetermined time thereafter.

9. In an apparatus for applying sealing material to containers, the combination of a movable support, a holder provided at its outer end with a plurality of holding members adapted to engage with the inner surface of the bottom end portion of a container having its bottom spaced upwardly from the bottom edge thereof, means for causing said holding members to bear against said inner surface of the container with sufficient pressure to support the container, means for retracting said holding members toward the axial center of said holder so that a container may be positioned on or removed from said holder, means for pivotally and rotatably supporting the inner end of said holder on said movable support, means for revolving the holder so that the container carried thereby is rotated about its central axis, a tank positioned close below the path of the container on said holder, and means for pivoting said holder about its support so that the rotating container carried thereby is dipped into the sealing material in the tank, said revolving means being adapted to rotate said holders and containers continuously during the passage of the containers through the sealing material and for a predetermined time thereafter.

10. An apparatus such as set forth in claim 9 including means for stopping the rotation of said holder during the period that said retracting means has withdrawn the holding members towards the axial center of said holder.

11. In an apparatus for applying sealing material to containers, the combination of a movable support, a holder pivotally and rotatably supported at its inner end on said movable support and provided on its outer end with a plurality of holding members adapted to engage with the inner surface of the bottom end portion of a container having its bottom spaced upwardly from the bottom edge thereof, means for causing said holding members to bear against said inner surface of the container with sufficient pressure to support the container, means for retracting said holding members towards the axial center of said holder so that a container may be positioned on or removed from said holder, said means comprising a stationary cam adapted to engage with said holder during a predetermined portion of its travel, means for revolving the holder so that the container carried thereby is rotated about its central axis, a tank positioned close below the path of the container on said holder, and means for pivoting said holder about its support so that the rotating container carried thereby is dipped into the sealing material in the tank, said revolving means being adapted to rotate said holders and containers continuously during the passage of the containers through the sealing material and for a predetermined time thereafter.

12. In an apparatus for applying sealing material to containers, the combination of a movable support, a holder provided at its outer end with a plurality of outwardly extending pivoted arms, the outer ends of said arms being adapted to engage with the inner surface of the bottom end portion of a container having its bottom spaced upwardly from the bottom edge thereof, means for causing the outer end portions of said arms to bear against said inner surface of the container with sufficient pressure to support the container, means for pivoting said arms toward the axial center of said holder so that a container may be positioned on or removed from said holder, means for pivotally and rotatably supporting the inner end of said holder on said movable support, means for revolving the holder so that the container carried thereby is rotated about its central axis, a tank positioned close below the path of the container on said holder, means for pivoting said holder about its support during its movement with the movable support so that the rotating container carried thereby is dipped into and removed from the sealing material in the tank and means for limiting the upward movement of said holder, said revolving means being adapted to rotate said holders and containers continuously during the passage of the containers through the sealing material and for a predetermined time thereafter.

13. In an apparatus for applying sealing material to containers, the combination of a movable support, a holder comprising a hollow shaft having integrally associated with its outer end thereof a recessed head portion adapted to receive the bottom end portion of a container having its bottom spaced upwardly from the bottom edge thereof, a plurality of angularly shaped levers pivotally mounted on said head portion and positioned within said recess, one arm of each of said levers projecting outwardly and the other arm of each of said levers extending toward the axial center of said holder, the outer end of each of said outwardly projecting arms being adapted to engage with the inner surface of the bottom end portion of a container, means for causing said arms to bear against said inner surface of the container with sufficient pressure to securely clamp the bottom portion of the container against the side wall of the recess, means associated with the axially extending arms of said levers for pivoting the outwardly projecting arms of said levers toward the axial center of said holder so that a container may be positioned in or removed from said recess, means for pivotally and rotatably supporting the inner end of said holder shaft on said movable support, means for revolving the holder so that the container carried thereby is rotated about its central axis, a tank positioned below the path of the container on said holder, and means for pivoting said holder about its support so that the rotating container carried thereby is dipped into the sealing material in the tank, said revolving means being adapted to rotate said holders and containers continuously during the passage of the containers through the sealing material and for a predetermined time thereafter.

14. An apparatus such as set forth in claim 13 in which the outer end portions of the outwardly projecting arms of said levers are roughened to enable said arms to securely grip the said inner surface of the container, and means to limit the movement of said arms toward the side wall of the recess.

15. An apparatus such as set forth in claim 13 in which the means for causing said outwardly extending arms of the levers to bear against said inner surface of the container comprises a supporting member mounted centrally of said recess and a plurality of springs projecting radially from the axis of rotation of said holder, one end of each of said springs being mounted on said supporting member and the other end of each of said springs being mounted on said outwardly extending arms.

16. An apparatus such as set forth in claim 13 in which the means for pivoting the outwardly projecting arms of said levers toward the axial center of said holder comprises a plunger head positioned in said recess and adapted to engage with the axially extending arms of said levers, a stem secured to said plunger head and extending through said hollow shaft, and means to move said stem and plunger head rearwardly at predetermined intervals to pivot the levers about their supports.

17. An apparatus such as set forth in claim 13 in which the means for pivoting the outwardly projecting arms of said levers toward the axial center of said holder comprises a plunger head positioned in said recess and adapted to engage with the axially extending arms of said levers, a stem secured to said plunger head and extending through said hollow shaft, a member secured to the inner end of said stem and a stationary cam adapted to engage with said member to retract said stem and plunger head and thereby pivot said levers about their supports.

18. An apparatus such as set forth in claim 13 in which the inner end of said shaft is supported in a bearing pivotally mounted on said movable support, a track positioned adjacently to said movable support, and an annular member secured to said shaft intermediate its ends and adapted to ride on said track whereby the shaft of said holder is caused to rotate when moved along by said movable support.

19. In an apparatus for applying sealing material to containers, the combination of a turntable, a plurality of container holders projecting radially from the axis of rotation of said turntable and adapted to carry containers on their outer ends so that the central axes of the containers project radially from the axis of rotation of the turntable, each of said holders comprising means adapted to engage one end of a container and to support the container with its other end projecting freely beyond said holder during the rotational movement of said turntable, a tank containing sealing material positioned close below the path of the containers on said holders, means for rotating said turntable for moving the containers on said holders successively over said tank of sealing material, means for revolving the holders so that the containers carried thereby are rotated about their central axes, and means for lowering and raising the outer ends of said holders as they are moved across said tank so that the free ends of the rotating containers carried thereby are dipped into and removed from the sealing material in said tank, said revolving means being adapted to rotate said holders and containers continuously during the passage of the containers through the sealing material and for a predetermined time thereafter.

20. In an apparatus for applying sealing material to containers, the combination of a turntable, a plurality of container holders projecting radially from the axis of rotation of said turntable and adapted to carry containers on their outer ends so that the central axes of the containers project radially from the axis of rotation of the turntable, each of said holders comprising means adapted to engage one end of a container and to support the container with its other end projecting freely beyond said holder during the rotational movement of said turntable, a tank containing sealing material positioned close below the path of the containers on said holders, means for rotating said turntable for moving the containers on said holders successively over said tank of sealing material and means for revolving the holders so that the containers carried thereby are rotated about their central axes, said means being adapted to lower and raise the outer ends of said holders as they are moved across said tank so that the free ends of the rotating containers are dipped into and removed from the sealing material in said tank and being adapted to rotate said holders and containers continuously during the passage of the containers through the sealing material and for a predetermined time thereafter.

21. In an apparatus for applying sealing material to containers, the combination of a turntable, a plurality of container holders projecting radially from the axis of rotation of said turntable, each of said holders being adapted to support a container on its outer end so that the central axis of the container projects radially from the axis of rotation of the turntable, means for pivotally and rotatably supporting the other ends of said holders on said turntable, a tank containing sealing material positioned close below the path of the containers, means for rotating said turntable for moving the containers on said holders successively over said tank of sealing material, means engaging with said holders intermediate their ends for revolving the same so that the containers carried thereby are rotated about their central axes, and means for lowering and raising the holders about their pivotal supports as they are moved across said tank so that the rotating containers carried thereby are dipped into and removed from the sealing material in said tank, said revolving means being adapted to rotate said holders and containers continuously during the passage of the containers through the sealing material and for a predetermined time thereafter.

22. In an apparatus for applying sealing material to containers, the combination of a turntable, a plurality of container holders projecting radially from the axis of rotation of said turntable, each of said holders being adapted to support a container on its outer end so that the central axis of the container projects radially from the axis of rotation of the turntable, means for pivotally and rotatably supporting the other ends of said holders on said turntable, a track encircling said turntable and adapted to support said holders intermediate their ends, said circular track comprising a level portion for supporting the holders in substantially horizontal position and a depressed inclined portion for supporting the holders in tilted position, a tank containing sealing material positioned close below the depressed inclined portion of the track so that the containers on the outer ends of the holders will be dipped into the sealing material, and means for rotating said turntable for moving the holders around on the track whereby the container holders will be rotated about their central axes continuously during the passage of the containers through the sealing material and for a predetermined time thereafter.

23. In an apparatus for applying sealing material to containers, the combination of a turntable, a plurality of container holders projecting radially from the axis of rotation of said turntable, each of said holders being adapted to support a container on its outer end so that the central axis of the container projects radially from the axis of rotation of the turntable, means for pivotally and rotatably supporting the other ends of said holders on said turntable, an annular member secured to each of said holders intermediate of their ends, a stationary track encircling said turntable and positioned with relation to the holders so that said annular members will ride on said track and thereby cause rotation of the holders and the containers about their own axes, said circular track comprising a level portion for supporting the holders in substantially horizontal position and a depressed inclined portion for supporting the holders in tilted position, a tank containing sealing material positioned closely below the depressed inclined portion of the track so that the containers will be dipped into the sealing material, and means for rotating said turntable for moving the holders around the track whereby the containers are rotated continuously about their axes during their passage through the sealing material and for a predetermined time thereafter.

24. In an apparatus for applying sealing material to containers, the combination of a turntable, a plurality of container holders projecting radially from the axis of rotation of said turntable, each of said holders being adapted to support a container on its outer end so that the central axis of the container projects radially from the axis of rotation of the turntable, a tank containing sealing material positioned closely below the path of the containers on said holders, means for rotating said turntable for moving the containers on said holders successively over said tank of sealing material, means for raising and lowering the outer ends of said holders as they are moved across said tank so that the containers carried thereby are dipped into and removed from the sealing material in the tank, means for revolving the holders for revolving the containers carried thereby about their central axes as the containers are carried around by the turntable and means for successively disconnecting each of the holders from said last mentioned means during the delivery of a container to the holder.

25. In an apparatus for applying sealing material to containers, the combination of a turntable, a plurality of container holders projecting radially from the axis of rotation of said turntable, each of said holders being provided with gripping means on its outer end adapted to securely support a container so that the central axes thereof project radially from the axis of rotation of the turntable, means pivotally and rotatably supporting the other ends of said holders on said turntable, a track encircling said turntable and adapted to engage with said holders intermediate their ends, means for rotating said turntable for moving the holders around on the track whereby said holders will be rotated about their central axes, a tank containing sealing material positioned close below the path of the containers on said holders, means for successively pivoting the holders about their supports as they are moved across said tank so that the rotating containers carried thereby are dipped into the sealing material in the tank, an arcuately shaped track positioned in operative relation with respect to the supports of said holders, and means on said holder supports adapted to ride on said arcuately shaped track and lift the holders from said circular track thereby ceasing the rotational movement of said holders about their own axes.

26. An apparatus such as set forth in claim 25 and including means for holding the gripping means on said containers in non-gripping position at predetermined intervals so that a container may be delivered to or removed from said holder.

27. An apparatus such as set forth in claim 25 in which axially movable means are provided in each of said holders for controlling the operation of said gripping means on the outer ends of said holders, an arcuately shaped cam adapted to engage with said axially movable means on said holders and hold said gripping means in non-gripping position so that a container may be delivered to or removed from the holders, said cam being so positioned with relation to said arcuately shaped track that the gripping means are held in non-gripping position when the rotational movement of the holders about their own axes has ceased.

28. In an apparatus for applying sealing material to containers, the combination of a movable support, a plurality of container holders mounted on said support, and adapted to carry containers so that the central axes thereof project outwardly from the support, each of said holders comprising means adapted to engage one end of the container and to support the container with its other end projecting freely beyond said holder during the travel of said movable support, means for revolving the holders so that the containers carried thereby are rotated about their central axes, a tank containing sealing material positioned close below the path of the holders so that the free ends of the rotating containers on said holders may be successively dipped into the sealing material and means co-acting with said holders to cause them to dip the containers only partially in the sealing material so that their axes form an acute angle with the surface of the sealing material while such holders are traveling across the tank of sealing material, said revolving means being adapted to rotate said holders and containers continuously during the passage of the containers through the sealing material and for a predetermined time thereafter.

29. In an apparatus for applying sealing material to containers, the combination of a movable support, a container holder mounted on said movable support and adapted to carry a container on its outer end so that the central axis thereof projects outwardly from the support, said holder comprising means adapted to engage one end of a container and to support the container with its other end projecting freely beyond said holder during the travel of said movable support, means for revolving the carrying end of said holder so that the container carried thereby is rotated about its central axis during the movement of the support and means for applying sealing material to the container including mechanism for changing the angle at which the container holder is disposed with relation to said support during the application of the sealing material so that the container is tilted downwardly during this operation, said revolving means being adapted to rotate said holders and containers continuously during the passage of the containers through the sealing material and for a predetermined time thereafter.

30. In an apparatus for applying paraffin to containers, the combination of a conveyor, container carriers on the conveyor partaking of the movement thereof, each of said carriers comprising means adapted to engage one end of a container and to support the container with its other end projecting freely beyond said carrier during the travel of said conveyor, means adapted to apply paraffin to the containers including mechanism for successively changing the angle at which the container holders are disposed with relation to said conveyor during the application of the sealing material so that the containers are tilted downwardly during this operation, means for rotating the carriers during the movement of the conveyor so that the containers are rotated continuously during the application of the paraffin thereto and for a predetermined time thereafter and means for rendering said last means inoperative after such period of time without effecting the movement of said conveyor.

31. In an apparatus for applying sealing material to containers, the combination of an endless conveyor, a plurality of container carriers on the conveyor partaking of the movement thereof, a tank for containing sealing material, means for tilting each carrier as it is traveling across the tank to dip the container carried thereby into the sealing material, means for rotating the carriers during the movement of the conveyor so that the containers are rotated continuously about their central axes during the application of the sealing material thereto and for a predetermined time thereafter and means adapted to inhibit the imparting of rotative movment to said carriers by said last mentioned means after such period of time without effecting the movement of said carriers by said conveyor.

32. In an apparatus for applying sealing material to containers, the combination of an endless conveyor, a plurality of container holders on the conveyor partaking of the movement thereof and adapted to carry containers so that the central axes thereof project outwardly from the conveyor, each of said holders comprising means adapted to engage one end of a container and to support the container with its other end projecting freely beyond said holder during the travel of said conveyor, a tank for containing sealing material, means for tilting each holder as it is traveling across the tank to dip the container carried thereby into the sealing material so that a portion only of the container is immersed in the sealing material, means for rotating the holders during the movement of the conveyor so that the containers are rotated continuously about their central axes during the application of the sealing material thereto and for a predetermined time thereafter and means adapted to stop the axial rotation of the containers after such period of time, while enabling them to continue partaking of the movement of said conveyor.

33. In an apparatus for applying sealing material to containers, the combination of an endless conveyor whose rotational movement lies in a substantially horizontal plane, a plurality of container holders on the conveyor partaking of the movement thereof and adapted to carry containers so that the central axes thereof project outwardly from the conveyor, a tank for containing sealing material, means for tilting each holder downwardly as it is traveling across the tank so as to dip the container into the sealing material with its central axis disposed at an angle to the surface of such material without completely immersing the container, said means being adapted to maintain the holder in tilted position for a predetermined period during the movement of the conveyor, means for rotating the holders during the movement of the conveyor so that the containers are rotated continuously during the application of the sealing material thereto and for a predetermined time thereafter and means for disengaging said holders from said last mentioned means after such period of time without effecting the movement of said holders by said conveyor.

34. In a machine for sealing filled containers having paper bodies and closure members closing the filling ends thereof, the combination of a traveling conveyor, a plurality of container holders thereon traveling with said conveyor, each of said holders comprising means adapted to engage a filled container backward of its closure member and to support such container during travel of the conveyor, a tank containing sealing material located close below the path of travel of said containers, means to depress said holders as the containers are traveling across the tank to submerge a portion of the containers forwardly of said holders in the sealing material, means to rotate said containers about their central axes during submersion in the sealing material so that a coating of such material is applied to the filling ends of the containers and to the peripheral edge portions of the closure members thereof, said last-mentioned means being adapted to rotate the containers for a predetermined time after such submersion of the containers and means to stop the axial rotation of the containers after such period of time without effecting the movement of said holders by said traveling conveyor.

35. In a machine for sealing filled containers having closure members closing the filling ends thereof, the combination of a traveling conveyor, a plurality of container holders thereon traveling with said conveyor, each of said holders comprising means adapted to engage a filled container backward of its closure member and to support such container with the filling end thereof projecting beyond the holder during the travel of the conveyor, a tank containing sealing material located close below the path of travel of said containers, means to tilt said holders successively as the containers are traveling across the tank to dip the containers in the sealing material, means to rotate said containers about their central axes during the application of the sealing material so that a coating of such material is applied to the filling ends of the containers and to the peripheral edge portions of the closure members thereof, said last-mentioned means being adapted to rotate the containers for a predetermined time after the application of the sealing material and means to stop the axial rotation of the containers after such period of time.

JAMES D. REIFSNYDER.